(12) United States Patent
Hashimoto et al.

(10) Patent No.: US 7,540,817 B2
(45) Date of Patent: Jun. 2, 2009

(54) TENSIONER WITH ONE-WAY CLUTCH

(75) Inventors: Hiroshi Hashimoto, Kita-ku (JP);
Masaki Kato, Kita-ku (JP)

(73) Assignee: Tsubakimoto Chain Co., Osaka (JP)

( * ) Notice: Subject to any disclaimer, the term of this patent is extended or adjusted under 35 U.S.C. 154(b) by 485 days.

(21) Appl. No.: 10/978,639

(22) Filed: Nov. 1, 2004

(65) Prior Publication Data

US 2005/0143207 A1    Jun. 30, 2005

(30) Foreign Application Priority Data

Dec. 26, 2003    (JP) ............................. 2003-434711

(51) Int. Cl.
*F16H 7/08* (2006.01)
*F16D 41/20* (2006.01)

(52) U.S. Cl. ..................... 474/111; 474/109; 192/41 S; 192/81 C

(58) Field of Classification Search .................. 474/109, 474/111; 192/41 S, 81 C
See application file for complete search history.

(56) References Cited

U.S. PATENT DOCUMENTS

| 4,392,840 A | 7/1983 | Radocaj |
| 4,583,962 A | 4/1986 | Bytzek |
| 4,822,322 A * | 4/1989 | Martin ........................ 474/135 |
| 5,653,652 A | 8/1997 | Simpson |
| 6,394,247 B1 * | 5/2002 | Monahan et al. ............ 192/41 S |
| 6,394,248 B1 * | 5/2002 | Monahan et al. ............ 192/41 S |
| 6,592,482 B2 * | 7/2003 | Serkh ........................... 474/135 |
| 2003/0078124 A1 * | 4/2003 | Serkh ........................... 474/135 |
| 2003/0186765 A1 * | 10/2003 | Konishi et al. ............... 474/109 |
| 2005/0059518 A1 * | 3/2005 | Joslyn ......................... 474/135 |

FOREIGN PATENT DOCUMENTS

| GB | 530185 | 12/1940 |
| GB | 922633 | 4/1963 |
| JP | 55132453 A | 10/1980 |
| JP | 58-142058 | 8/1983 |
| JP | 60065945 A | 4/1985 |
| JP | 61-149660 | 7/1986 |
| JP | 63-142433 | 9/1988 |

OTHER PUBLICATIONS

Patent Abstracts of Japan, Backlashless Ratchet Type Tensioiner, Publication No. 3226029, Publication Date Aug. 31, 2001, Application No. 10-223066, Inventor's Name, Yasushi Suzuki et al.
Patent Abstracts of Japan, Ratchet Type Tensiioner, Publication No 3226030, Publication Date Aug. 31, 2001, Application No. 10-234640, Inventor's Name, Yasushi Suzuki et al.

* cited by examiner

*Primary Examiner*—Robert A Siconolfi
*Assistant Examiner*—Thomas W Irvin
(74) *Attorney, Agent, or Firm*—Howson & Howson LLP

(57) ABSTRACT

A tensioner for maintaining tension in a timing chain or belt comprises a pivotally mounted lever body biased in a direction to increase tension in the chain or belt, and having a built-in, one-way clutch permitting the lever to pivot the tension-increasing direction but blocking pivoting movement in the opposite direction.

5 Claims, 8 Drawing Sheets

TENSIONER WITH ONE-WAY CLUTCH

FIELD OF THE INVENTION

This invention relates to tensioners, and particularly to a tensioner which imparts tension to a power transmission chain or belt through a tensioner lever in sliding-contact with the slack side of the chain or belt. The invention relates more specifically to a tensioner having a one-way clutch, which prevents the tensioner lever from pivoting in a direction such that tension in the transmission medium is reduced.

BACKGROUND OF THE INVENTION

Endless flexible power transmission media, in the form of chains or belts, have been widely used in the timing drive systems of engines, and also as for power transmission in industrial machinery and the like. Tensioners are used to prevent vibration in these chains and belts, and, at the same time, to take up slack resulting from their elongation. The tensioner typically presses against a tensioner lever, which is in sliding contact with the chain or belt. One well-known type of tensioner, known as a ratchet-type tensioner, is described in Japanese Patent Nos. 3226029 and 3226030.

An example of a conventional ratchet-type tensioner is shown in FIGS. 7 and 8. As shown in FIG. 7, the tensioner 51, which is attached to an engine body (not shown), imparts tension to a timing chain 56, which is wrapped around a driving sprocket 53 on the crankshaft 52 of the engine, and a driven sprocket 55 fixed to a camshaft 54. The tensioner presses a pivotable tensioner lever 60 against the slack side of the chain 56.

In the ratchet type tensioner 51, a plunger 58 protrudes slidably from the front of the tensioner housing 57, and an end 58a of the plunger 58 pushes against a back surface of a pivoted tensioner lever 60 at a location remote from the lever's pivot 59, so that a shoe 61 of the lever 60 is pressed against the chain 56.

As shown in FIGS. 7 and 8, a plunger-accommodating hole 62 is formed in the tensioner housing. The plunger 58 fits slidably into the plunger-accommodating hole. A hollow portion 63, formed inside the plunger 58, has an opening facing the bottom of the plunger-accommodating hole 62. A spring 64 is installed between the bottom of the plunger-accommodating hole 62 and the bottom of the hollow portion 63. The spring 64 biases the plunger 58 in a direction to protrude from the tensioner housing 57.

A pawl 66 is pivoted on a ratchet shaft 65 fixed to the tensioner housing. The pawl 66 has ratchet teeth 66a engageable with ratchet teeth 58b formed on a side of the plunger 58.

A biasing force is imparted to the pawl by a spring 67 in compression between the ratchet 66 and the tensioner housing 57. This force urges the pawl in a direction such that its teeth 66a engage the ratchet teeth 58b on the plunger. The engagement between the pawl teeth 66a and the ratchet teeth 58b blocks retraction of the plunger 58.

Since the main components of the conventional ratchet type tensioner comprise the tensioner housing 57, the plunger 54, the plunger spring 64, the pawl spring 67 and other parts, the total number of parts is large. The number of parts is even greater in the case of a ratchet-type hydraulic tensioner, where the plunger and the tensioner body cooperatively form a high pressure oil chamber which is in communication with the engine lubricating oil through a one-way check valve.

In addition, in the production of the tensioner it is necessary to form the plunger-accommodating hole 62 and a hole in the housing for accommodating the pawl spring 67. Furthermore, a hollow portion 63 must be formed in the plunger 58, and ratchet teeth 58b must be formed on the exterior of the plunger 58. Manufacture of these elements requires a large amount of time and labor, resulting in a high cost.

In the operation of a ratchet-type tensioner, until the plunger 58 is advanced by one ratchet tooth so that the pawl 66a climbs over a next tooth 58b of the ratchet 66, forward movement of the plunger may be followed by a limited amount of backward movement. Thus, a significant amount of backlash can occur in the case of a ratchet-type hydraulic tensioner, resulting in vibration of the plunger, the tensioner lever, and the chain or belt. Such vibration can also occur in a ratchet-type hydraulic tensioner, especially upon starting of an engine, when oil under pressure is not supplied immediately to the high pressure oil chamber of the tensioner.

Objects of this invention are to solve the above-mentioned problems, to provide a tensioner having a simple structure quite different from that of a conventional tensioner, to provide for easier manufacture, and to suppress backlash more effectively.

SUMMARY OF THE INVENTION

The tensioner according to the invention comprises a base, a shaft fixed to and extending from the base along a pivot axis, a lever body, pivotally mounted on the base for rotation about the shaft axis, biasing means urging said lever body to rotate pivotally in one direction about the shaft axis, whereby the lever can push a tensioner lever against an endless, flexible, power transmission medium to maintain tension therein, and a one-way clutch mechanism connected to the lever body and to the base, the clutch mechanism allowing the lever body to pivot freely in said one direction and blocking pivoting of the lever body in the opposite direction.

The one-way clutch preferably comprises a first annular member in fixed relationship to the lever, a second annular member fixed to the base, and a coil spring. The annular members are rotatable relative to each other and in coaxial relationship to the shaft. The annular members have cylindrical inner circumferential surfaces both of the same diameter whereby the inner circumferential surfaces are in flush relationship with each other. The coil spring has a relaxed outer diameter larger than the inner diameter of the cylindrical inner surfaces of the annular members, and presses outwardly against the cylindrical inner surfaces of the annular members. The first annular member has an annular step formed on an end thereof, and the second annular member also has an annular step formed on an end thereof. These annular steps overlap and engage each other in relatively rotatable sliding relationship, thereby supporting the lever against radial movement relative to the shaft while allowing the lever to pivot about the shaft in said one direction.

In one preferred embodiment of the invention, the first annular member is a boss unitary with the lever body.

Upon rotation of the lever in said one direction, the diameter of the coil spring is reduced, thereby reducing the outward pressing force exerted by the spring on the cylindrical inner surfaces of the annular members, and upon rotation of the lever in the opposite direction the diameter of the coil spring is increased, thereby increasing the outward pressing force exerted by the spring on the cylindrical inner surfaces of the annular members.

In one embodiment, the biasing means is composed of a compression spring having two ends, one of which is in engagement with the lever body at a location spaced radially from the shaft and the other of which is in engagement with a holder fixed to the base.

In an alterative embodiment, the biasing means is composed of a torsion coil spring having a coiled portion surrounding the annular members and spaced radially therefrom. One end of the torsion coil spring is engaged with the base, and the other end is engaged with the lever body.

The base may be a component of a transmission device comprising an endless, flexible, power transmission medium, for example, the engine block itself. Alternatively, the base may be a plate attachable to such a transmission device.

The one-way clutch ensures that the tensioner lever always imparts appropriate tension to the chain or belt without backlash.

Because the clutch comprises relatively rotatable first and second annular members, and a coil spring pressing against the inner circumferential surfaces of the annular members, the tensioner can have a very simple structure. Furthermore, the clutch can be easily assembled by inserting the coil spring while rotating the annular members in a direction such that friction between the annular members and the spring causes the diameter of the spring to decrease.

Where the first annular member of the clutch is a boss formed as a unitary part of the lever body, the structure of the tensioner is very simple, and this version in particular can be advantageously manufactured from synthetic resin. When the outer circumferential surfaces of the annular members of the clutch are flush with each other, a torsion coil spring for biasing the lever can be fitted easily in surrounding, spaced relationship with the annular members so that its coiled portion does not come into contact with the annular members.

Since the outward force exerted by the spring on the annular members of the clutch increases with rotation of the lever body in one direction and decreases with rotation in the opposite direction, reverse pivoting of the lever can be effectively blocked, and appropriate tension can be applied reliably to a chain or belt.

Where a compression spring is used to bias the lever, the compression spring can be easily mounted between the lever and a fixed holder. In the case where a coiled torsion spring is used to bias the lever, the coiled portion of the spring can be incorporated into the interior of the lever, and consequently a very compact tensioner can be realized.

A reduction in weight and improvement in simplicity can be realized Where the base is of the tensioner is an engine block or other component of the transmission. On the other hand, when the base is an element separate from the transmission, the tensioner can be supplied in a pre-assembled condition, and installed in the transmission more easily.

DETAILED DESCRIPTION OF THE PREFERRED EMBODIMENTS

The tensioner in accordance with the invention comprises a pivoted lever which is biased about its pivot axis in order to apply tension to a chain or belt, and includes a one-way clutch which allows the lever to pivot freely in the direction in which it tends to increase tension in the chain or belt, but prevents the lever from pivoting in the opposite direction.

Figure 1:
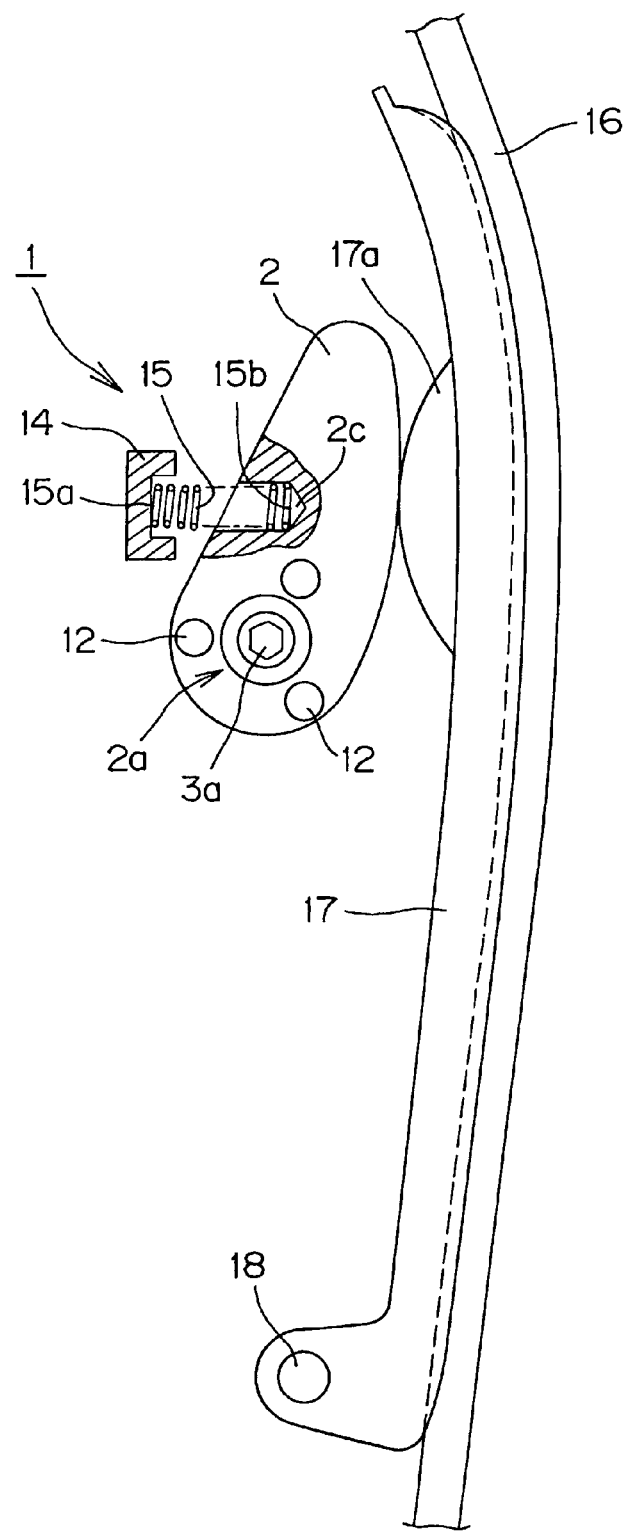
FIG. 1 is a side elevational view, partly in section, showing a tensioner lever, and a tensioner with a one-way clutch in accordance with a first embodiment of the invention.
Figure 2:
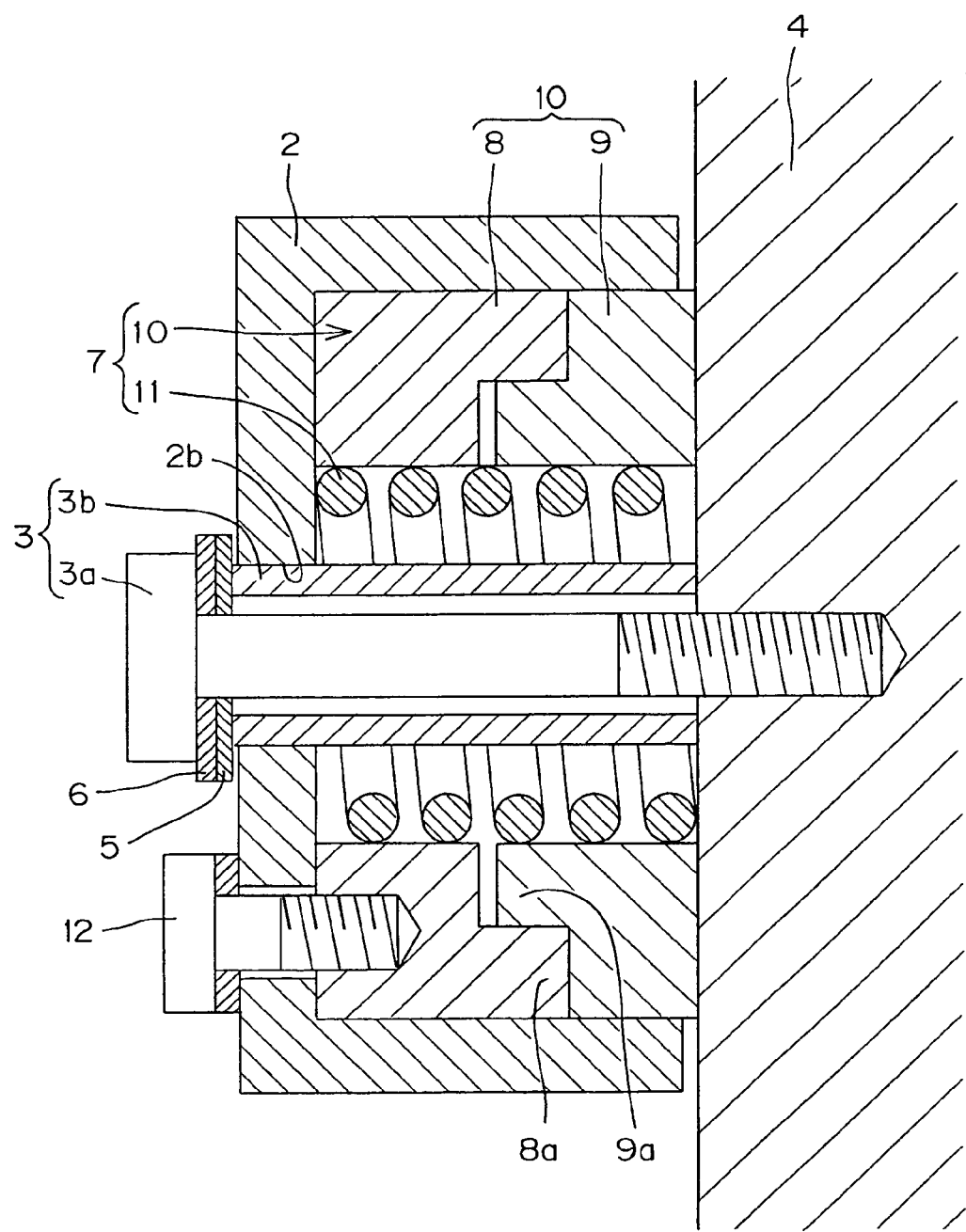
FIG. 2 is a cross-sectional view showing the internal structure of a part of the tensioner of FIG. 1.
Figure 3:
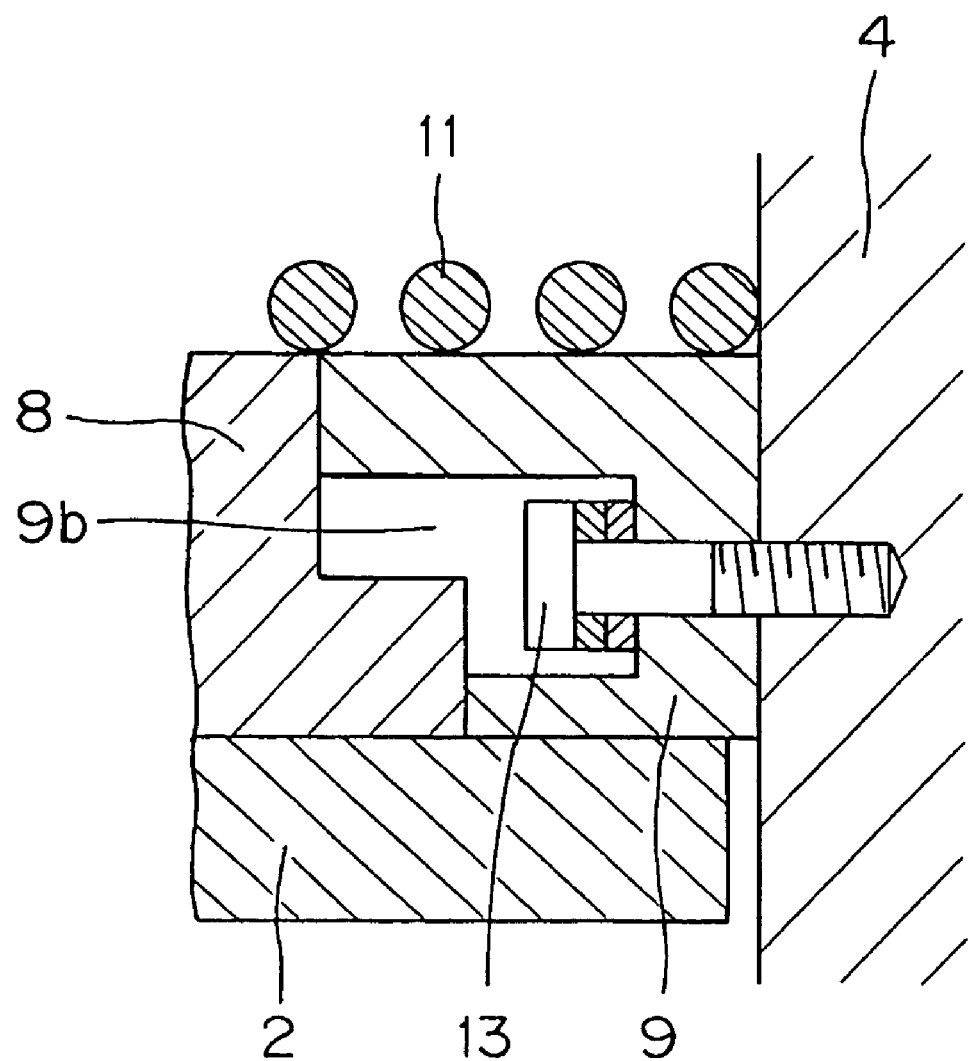
FIG. 3 is a cross sectional view showing how one of the two annular members of the clutch is attached to a base.

In the embodiment shown in FIGS. 1 to 3, the tensioner 1 presses against a pad 17a of a tensioner lever 17, which is in sliding contact with an endless transmission chain or belt 16. The chain or belt 16 is typically a timing chain or timing belt wrapped around a sprocket or pulley on the crankshaft of an engine and a sprocket or pulley on a camshaft. In order to maintain appropriate tension in the chain or belt 16, the tensioner urges the tensioner lever 17 so that it pivots about a mounting pin 18, which may be fixed to the engine block.

The tensioner 1 is composed of a lever 2 having a proximal portion 2a, to which a one-way clutch 7 is attached. The lever 2 is pivotally mounted on a base 4 (FIG. 2) which may be the engine block. The clutch 7 allows the lever 2 to pivot in the direction such that tension is increased in the chain or belt 16, but blocks pivoting of the lever 2 in the opposite direction.

The proximal portion 2a of the lever 2 is mounted on a base 4 for pivoting movement about the axis of a shaft 3, which is composed of a hex-head bolt 3a fitted with a collar 3b. The bolt is attached to the base 4, and the collar 3b fits, with a clearance, into a through hole 2b provided in the proximal portion 2a of the lever 2. A plain washer 5 and a spring washer are provided beneath the head of the bolt, and the length of the collar 3b is such that, the lever 2 can pivot freely with a small gap between the outwardly facing surface of the lever 2 and the plain washer 5. Although, in the embodiment depicted in FIG. 2, the collar shown fits loosely on the bolt shank, as an alternative, the shaft 3 may composed of a bolt press-fit into a collar.

The lever 2 is pivotally mounted on the base, not only by the shaft 3 and collar 3b, but also by a cylinder 10 composed of cooperating annular members 8 and 9. Members 8 and 9 have annular steps 8a and 9a, respectively, which loosely fit each other so that they are relatively rotatable.

The one-way clutch 7 comprises cylinder 10, composed of cooperating, relatively rotatable, annular members 8 and 9, and a helical coil spring 11, which fits into the cylindrical inner wall of cylinder 10.

As shown in FIGS. 2 and 3, annular step 8a is an outer step, protruding axially from member 8. Member 8 is is fixed to the interior of the lever 2 by a plurality of bolts 12. Annular step portion 9a is an inner step, protruding axially from member 9 and overlapping step 8a. Member 9 is fixed to the base 4 by bolts 13, one of which is shown in FIG. 3 in a recess 9b. As best shown in FIG. 2, concave and convex, preferably cylindrical, surfaces, of the annular steps 8a and 9a respectively, fit each other rotatably, while providing pivoting support for lever 2. The outer circumferential surfaces of members 8 and 9 are flush with each other so that the outer surface of the cylinder 10 has no step and fits the cylindrical inner wall of the lever 2. Likewise the inner circumferential surfaces of members 8 and 9 are flush with each other, so that they are both in contact with the helical coil spring 11.

The coil spring, when relaxed, has an outer diameter larger than the inner diameter of the cylinder 10. Consequently, when the coil spring 11 is installed in the cylinder 10, it presses outwardly against the inner circumferential surfaces of the two elements 8 and 9 forming cylinder 10. The installation of the coil spring 11 into the cylinder 10 can be carried out easily by rotating the coil spring 11 in a diameter-reduced direction while inserting it into the cylinder.

As shown in FIG. 1, the lever 2 is biased by a coil spring 15, which is in compression between a holder 14 and the lever. The holder 14 is fixed to the base 4. End 15a of the spring 15 is received in, and supported by, the holder 14, and the opposite end 15b of the spring is received in, and supported by, a hole 2c provided in the lever 2 at a location spaced from the proximal portion 2a of the lever.

As shown in FIG. 1 a part of the lever 2, spaced from the proximal portion thereof, presses against a pad 17a on a tensioner lever 17 pivoted on a pin 18. As the chain or belt 16 loosens due to elongation over time, the lever 2 is gradually pivoted by the biasing force exerted by compression spring 15 in a direction such that tension is maintained in the chain or belt 16.

The spring 11 is wound in a direction such that, when the lever pivots in the direction to press the tensioner lever 17 against the chain or belt, the frictional force exerted by the inner circumferential wall of annular member 8 on the spring tends to cause the spring to contract radially. Consequently, the spring allows the lever to pivot in this direction. On the other hand, a force exerted on the lever in the opposite direction results in a frictional force exerted on the spring by member 8 which tends to expand the spring radially, causing it to lock against the inner circumferential walls of both members 8 and 9, preventing relative rotation. Accordingly, the spring 11 and annular members 8 and 9 function as a one-way clutch, allowing the lever 2 to pivot only in the direction in which tension is applied to the chain or belt 16, and blocking pivoting movement of the lever 2 in the opposite direction. As a result, the tensioner lever 17 reliably imparts appropriate tension to the chain or belt 16 without backlash.

Since the main components of the tensioner are the lever 2, the shaft 3, the one-way clutch 7 consisting of cylinder 10 and the coil spring 11, and the compression spring 15, the number of the parts of the tensioner is comparatively small, and it can be made relatively light in weight. The tensioner is structurally simple, and can be manufactured easily at a relatively low cost.

Figure 4:
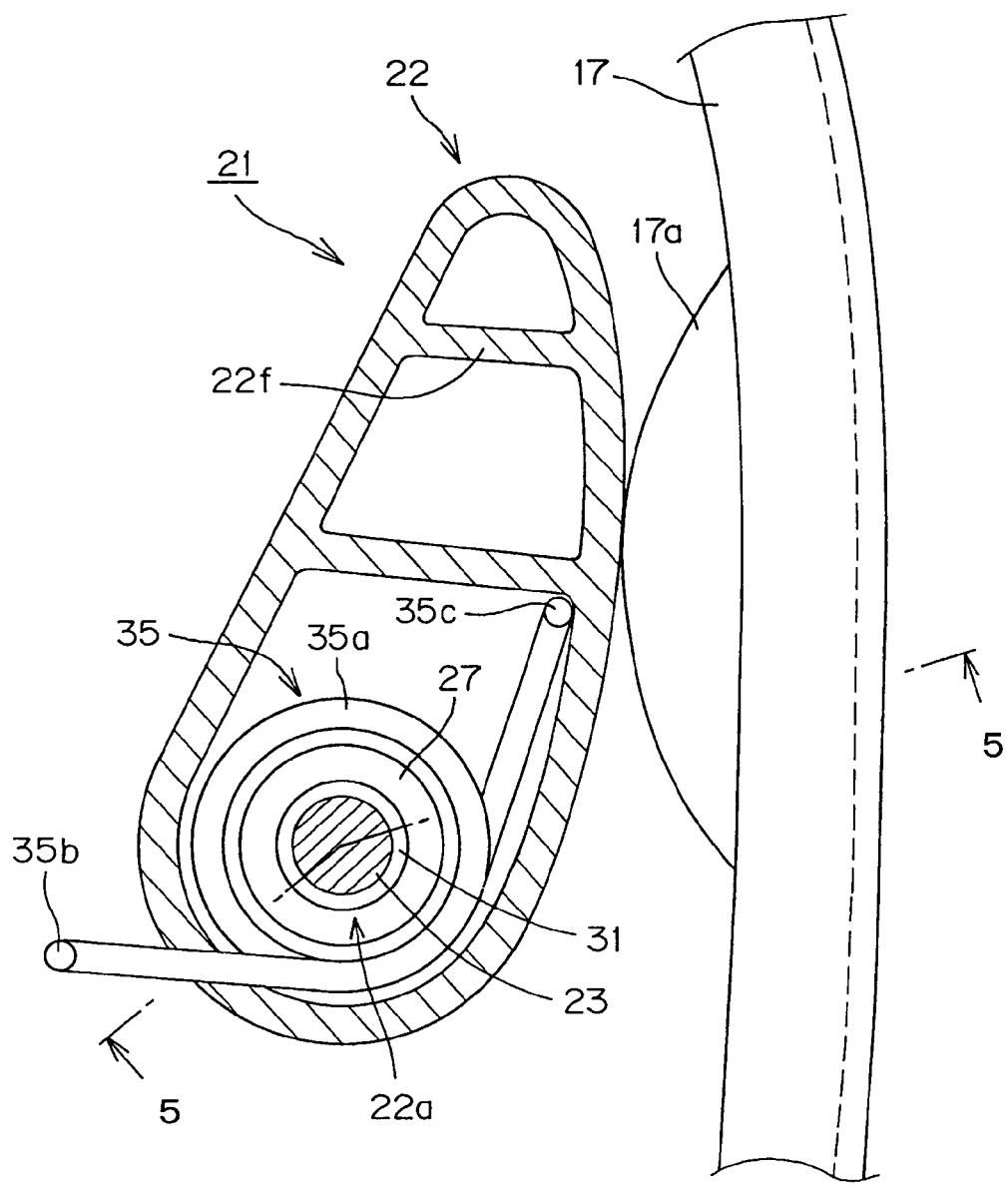
FIG. 4 is a side elevational view, partly in section, showing a tensioner lever, and a tensioner with a one-way clutch in accordance with a second embodiment of the invention.
Figure 5:
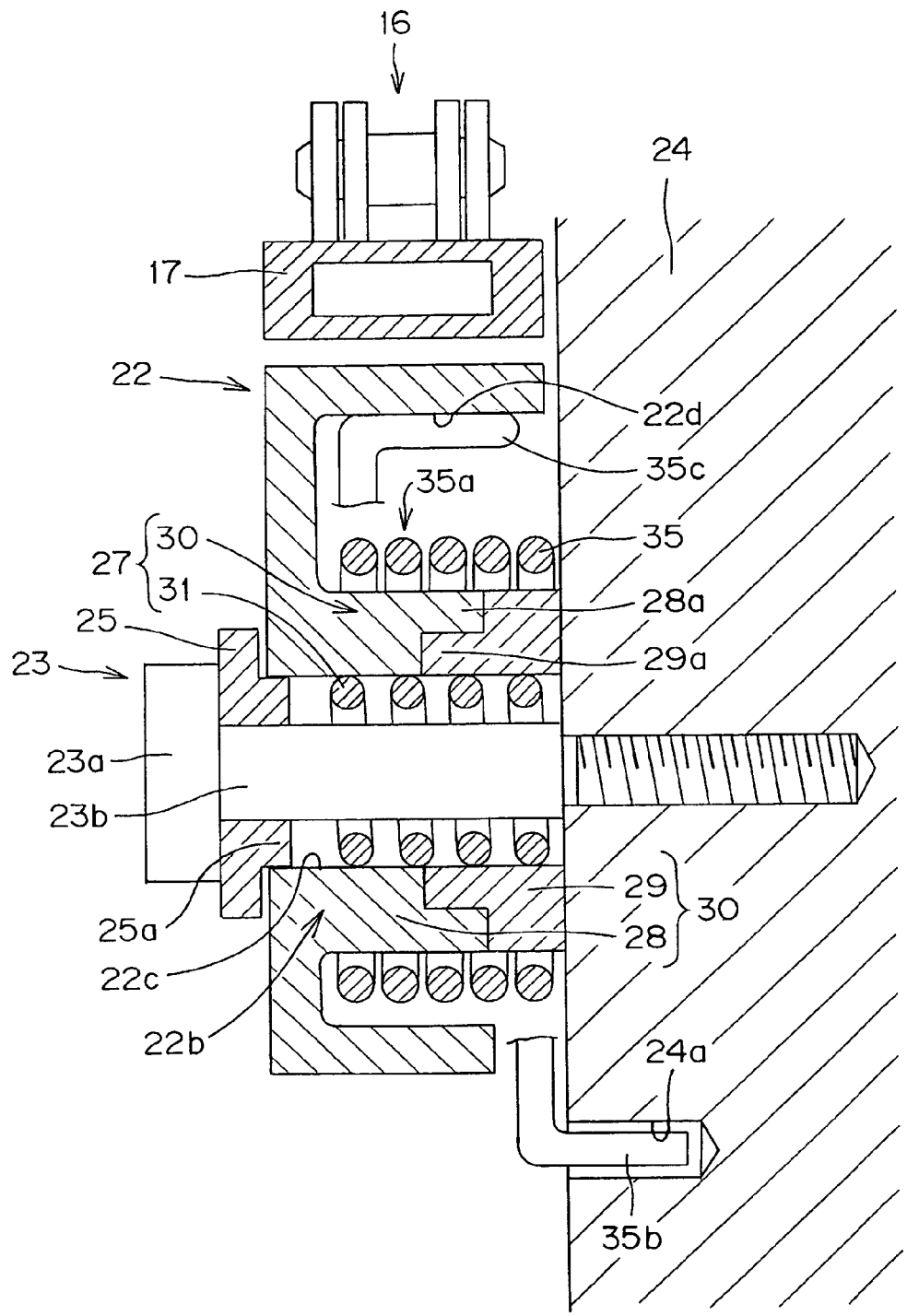
FIG. 5 is a cross-sectional view taken on surface 5-5 in FIG. 4.

In the second embodiment, shown in FIGS. 4 and 5, parts corresponding to those of the first embodiment are designated by the same reference numbers. As shown in FIG. 4, the tensioner 21 presses against a pad 17a of a tensioner lever 17, which is in sliding contact with a transmission chain or belt 16, and pivoted on a pin 18 fixed to a base 24.

The tensioner is composed of a lever 22 having a one-way clutch 27 attached to its proximal portion 22a. The lever 22 is pivotally mounted on a base 24 by means of a shaft 23 and can be pivoted in a direction where tension is imparted to the chain or belt 16, but prevented by the one-way clutch 27 from pivoting in the opposite direction. The lever does not require an external biasing spring as in the case of the first embodiment, and accordingly can be hollow. However, if made hollow, it is preferably formed with an internal reinforcing rib 22f.

As shown in FIG. 5, the proximal portion of the lever 22 is mounted on a shaft 23 composed of a hex-head bolt 23a with a shaft 23b having a larger diameter than that of the shaft of bolt 3a. The shaft portion 23b of the shaft 23 extends, with a clearance, through a hole 22c in a boss 22b formed at the proximal portion 22a of the lever 22. The shaft 23 is attached to base 24 so that the lever 22 is pivotally mounted on the base 24. In this case, the length of the shaft portion 23b is such that, when the lever 22 is mounted on the base 24, a gap is provided between the surface of the base 24 and the lever 22. This gap enables the lever 22 to pivot about the shaft 23.

A one-way clutch 27 is provided at the proximal portion 22a of the lever 22. This one-way clutch 27 comprises a cylinder 30 composed of relatively rotatable first and second annular members 28 and 29, and a helical coil spring 31 fitting into the interior of the cylinder 30.

As shown in FIG. 5, an annular step 28a is formed at an end of the first annular member 28, which is constituted by a boss 22b on lever 22. A mating annular step 29a is formed at an end of the second annular member 29. This second annular member 29 is fixed to the base 24 by bolts (not shown).

The cylinder 30 is formed by connecting the first and second annular members 28 and 29 so that so that their respective annular steps 28a and 29a overlap each other with a clearance. In the cylinder 30 thus formed, the first and second annular members 28 and 29 are relatively rotatable, and the inner circumferential surfaces of the members are flush with each other as are the outer circumferential surfaces. Consequently the inner and outer surfaces of the cylinder 30 have no steps. A coiled portion 35a of a torsion coil spring 35 for pivoting the lever 22 surrounds the outer portion of the cylinder 30, and can be easily installed since the outer portion of the cylinder has no step.

A stepped washer 25 fits onto the shaft 23b, and an annular reduced portion 25a is positioned in a gap between the shaft 23b and the inner circumferential surface of the boss 22b. This washer provides both axial and radial support for the lever. A plain washer may, of course, be used in place of the stepped washer 25, since the second annular member 29, which is fixed to the base 24, can provide sufficient radial support for the lever.

A helical coil spring 31, which, when relaxed, has an outer diameter larger than the inner diameter of the cylinder 30 fits into the interior of cylinder 30, and presses outwardly against the inner circumferential surface of the cylinder 30. The coil spring 31 can be easily installed by insertion into the hole of the cylinder while the coil spring 31 is rotated in the diameter-reduced direction.

The lever 22 is pivotally biased by the torsion coil spring 35. One end 35b of the torsion coil spring 35 is held fixed by being fitted into an engagement hole 24a formed in the base 24. The other end 35c of the spring bears against the inner surface of a wall of the lever 22, as shown in IFG. 4.

In the operation of the tensioner of the second embodiment, a part of the lever 22 remote from the pivot axis presses against pad 17a of tensioner lever 17, urging the lever 17 so that it rotates about pin 18 and bears against the chain or belt 16, applying tension to the chain or belt.

As the chain or belt 16 loosens due to elongation over time, the lever 22 is gradually pivoted by the biasing force of the torsion coil spring 35 in a direction to increase the tension in the chain or belt 16. Pivoting of the lever 22 in the opposite direction is blocked by expansion of spring 31 against the inner circumferential surfaces of annular member 28 and 29. As a result, the tensioner lever 17 will always impart appropriate tension to the chain or belt 16 without backlash.

Here, as in the case of the first embodiment, the number of the parts is relatively small. Moreover, the compression spring and holder are eliminated. The tensioner can also be made light in weight, and its simple structure makes manufacture easy and inexpensive.

In the second embodiment, of course, a compression spring can be used instead of a torsion spring to bias the lever, while taking advantage of various other features unique to the second embodiment, such as the boss formed as a unit with the lever body, the stepped washer, and the hollow lever body.

Figure 6:
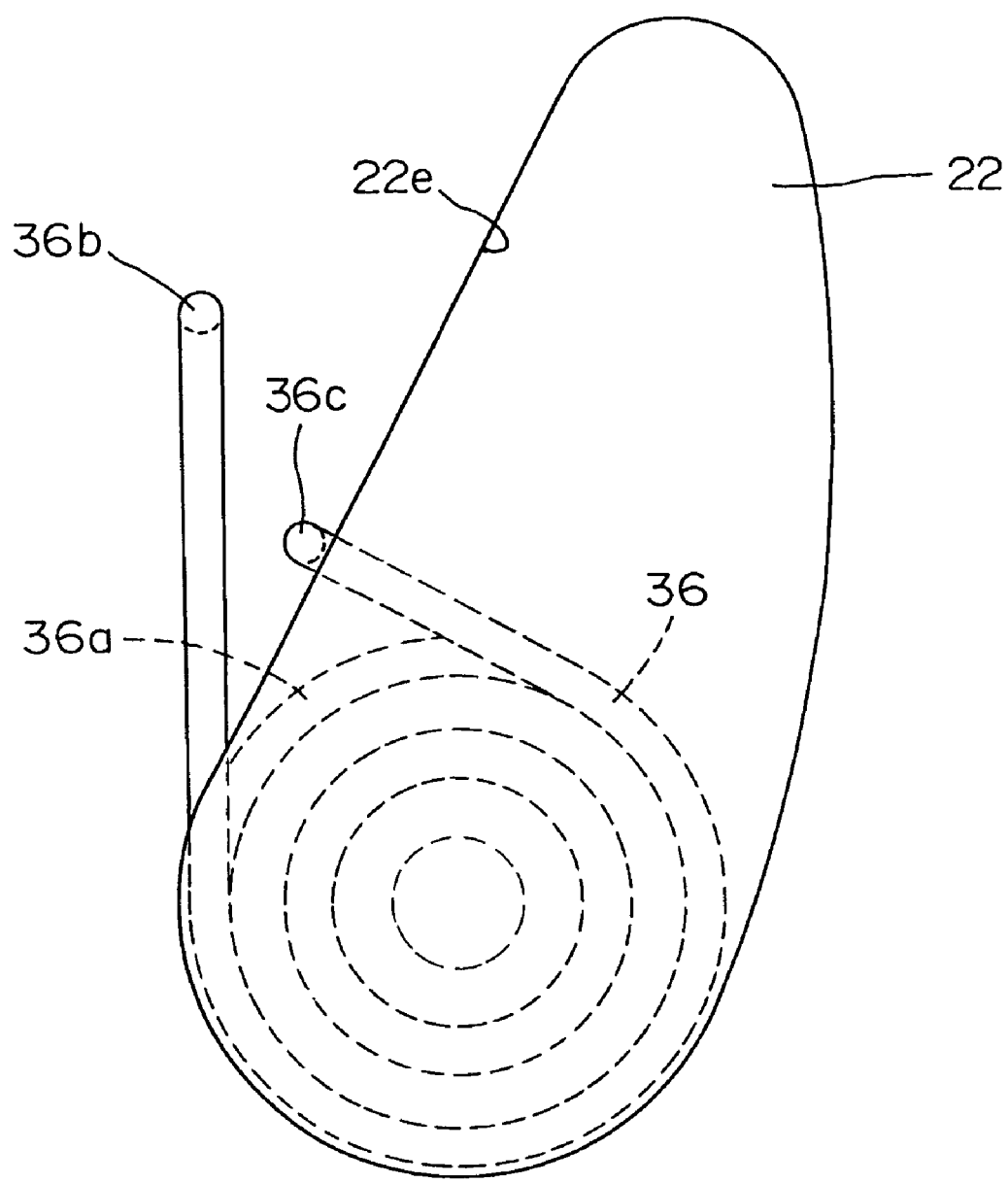
FIG. 6 is a side elevational view showing a modification of the tensioner of FIG. 4.
Figure 7:
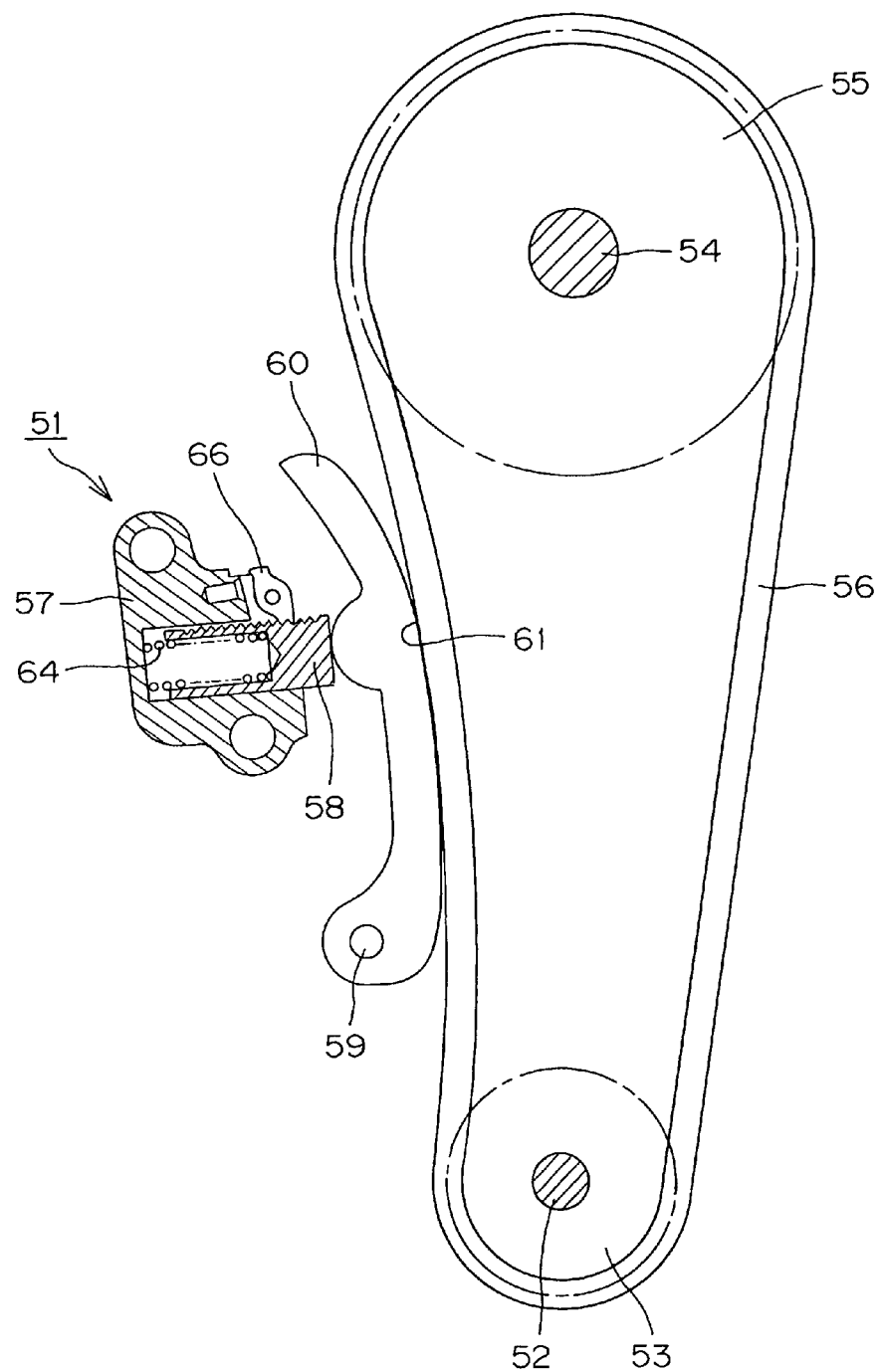
FIG. 7 is an elevational view of a typical engine valve timing transmission incorporating a conventional ratchet tensioner.
Figure 8:
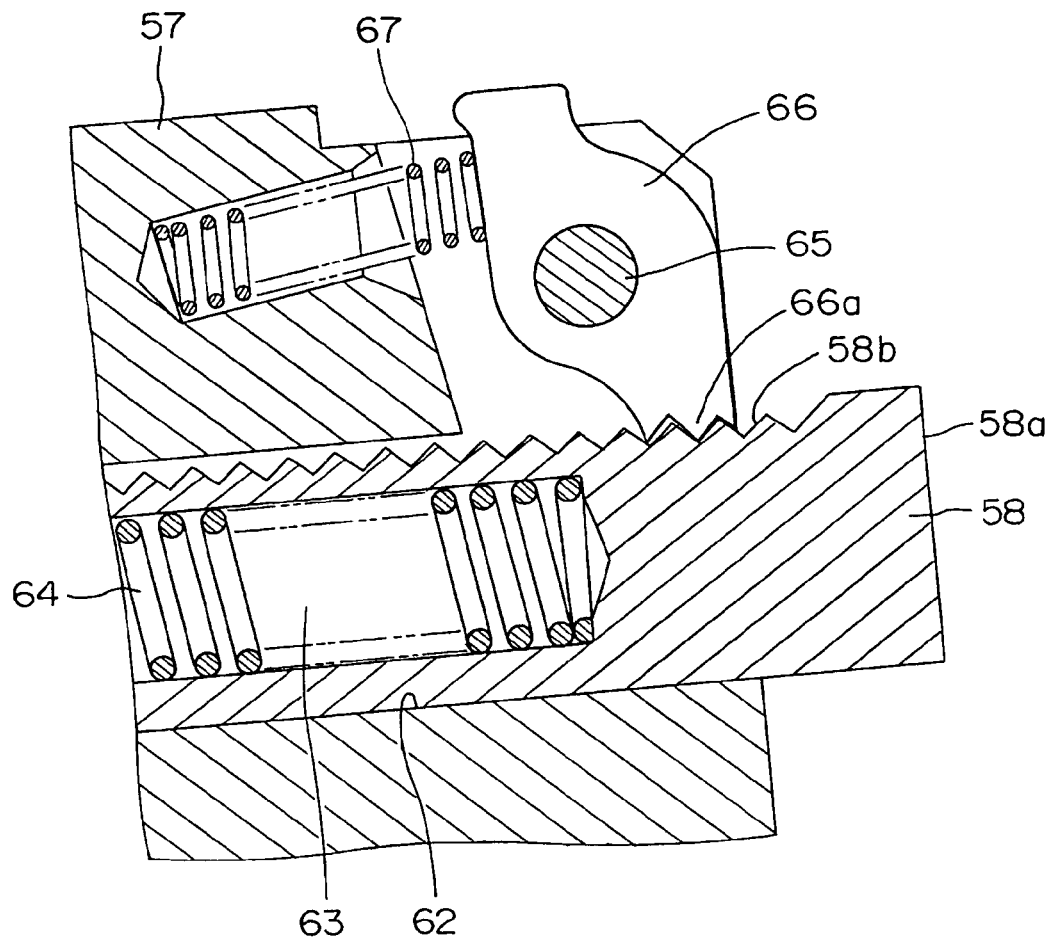
FIG. 8 is a cross-sectional view of a portion of the conventional ratchet tensioner.

As a modification of the torsion coil spring of the second embodiment, a torsion coil spring 36 as shown in FIG. 6 can be used. In this case, one end 36*b* is received in a hole formed in the base while he other end 36*c* bears against an outer wall surface 22*e* of the lever 22 rather than against an inner wall surface. In this case, as in FIG. 5, the winding portion 36*a* of the torsion coil spring 36 surrounds the outer circumferential surface of the clutch cylinder with a clearance. The portion of the spring 36 that bears against the outer surface of the lever body 22 can be connected to the coiled portion of the spring by a part of the spring that extends through a suitable opening in the lever body, or a part that is bent around the lever body so that it extends through a gap between the lever body and the base.

Various other modifications can be made to the tensioners described. For example, the base 4 or 24 can be an engine block or other portion of the transmission device, or, alternatively, it can be a plate attached to the engine block or transmission device. Various materials can be used to form the lever, including metals such as iron and aluminum, and synthetic resins. In the case of synthetic resins, weight reduction can be achieved. Although in the embodiments shown, the annular step of the annular member fixed to the lever body is on the outside of the annular step of the annular member fixed to the base, the configuration of the annular steps can be reversed, so that the annular step of the member fixed to the base is on the outside. Still other modifications, which will occur to persons skilled in the art, can be made to the tensioner described herein without departing from the scope of the invention as defined in the claims.

We claim:

1. In a transmission device comprising an endless, flexible power transmission medium, and a pivoted guide in sliding contact with said power transmission medium, a tensioner for maintaining tension in said transmission medium, said tensioner comprising a base, a shaft fixed to and extending from said base, a lever body, pivotally mounted for rotation relative to said base about an axis, said lever body having an interior space at least partly defined and surrounded by a wall spaced radially from said axis and having an exterior surface, and an opening facing said base, said lever body also having a guide-contacting surface continuous with said exterior surface of said wall, said guide-contacting surface being in pressing contact with said pivoted guide, biasing means urging said lever body to rotate pivotally in a direction about said axis such that said guide-contacting surface of the lever body exerts a force on the guide urging the guide, against said endless, flexible, power transmission medium to maintain tension therein by pivotal rotation about said axis in said one direction, and a one-way clutch mechanism connected to said lever body and to said base, said clutch mechanism allowing said lever body to pivot freely in said one direction and blocking pivoting of the lever body in the opposite direction, in which said one-way clutch comprises a first annular member fixed to said lever, a second annular member fixed to said base, said annular members being rotatable relative to each other and having coaxial, cylindrical inner circumferential surfaces, both having the same diameter whereby said inner circumferential surfaces are in flush relationship with each other, and a coil spring having a relaxed outer diameter larger than said inner diameter of the cylindrical inner surfaces of the annular members, said coil spring exerting an outward pressing force against said cylindrical inner circumferential surfaces of the annular members and being wound in a direction such that frictional contact between the spring and said inner circumferential surfaces tends to decrease the diameter of the coil spring, and thereby decrease said outward pressing force, when the lever body rotates in said first direction, and to increase the diameter of said coil spring, and thereby increase said outward pressing force, upon application to the lever body of a force tending to rotate said lever body in a direction opposite to said first direction, and in which said first annular member has an annular step formed on an end thereof and said second annular member also has an annular step formed on an end thereof, said annular steps overlapping and engaging each other in relatively rotatable sliding relationship, whereby the lever is supported against radial movement relative to said shaft while being pivotable about said shaft in said one direction, said first annular member is located within said interior space, and at least part of said second annular member and at least a part of said coil spring are also located within said interior space.

2. A transmission device according to claim 1, in which said first annular member is in the form of a boss located within said interior space of said lever body and extending toward said base.

3. A transmission device according to claim 1, in which said biasing means is composed of a compression spring having two ends, one of which is in engagement with the lever body at a location spaced radially from said axis and the other of which is in engagement with a holder fixed to the base.

4. A transmission device according to claim 2, in which said biasing means is composed of a compression spring having two ends, one of which is in engagement with the lever body at a location spaced radially from said axis and the other of which is in engagement with a holder fixed to the base.

5. A transmission device according to claim 2, in which said biasing means is composed of a torsion coil spring having a coiled portion surrounding said annular members and spaced radially therefrom, one end of said torsion coil spring being engaged with said base and the other end thereof being engaged with said lever body.

* * * * *